H. TRILLICH.
EXTRACTING CAFFEIN FROM COFFEE.
APPLICATION FILED APR. 15, 1909.
964,944.
Patented July 19, 1910.
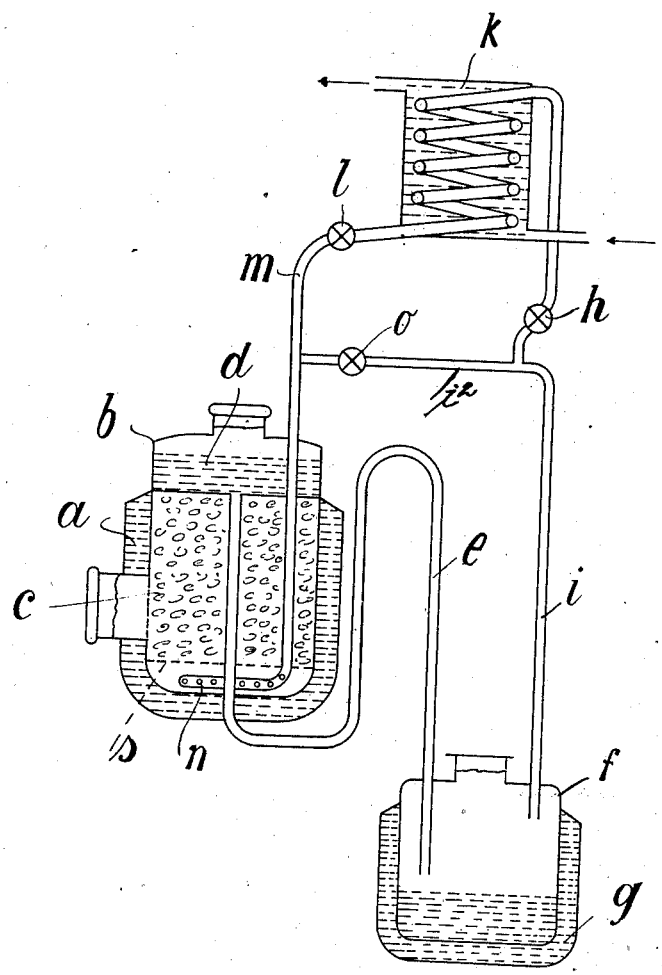

UNITED STATES PATENT OFFICE.

HEINRICH TRILLICH, OF MUNICH, GERMANY.

EXTRACTING CAFFEIN FROM COFFEE.

964,944.

Specification of Letters Patent. Patented July 19, 1910.

Application filed April 15, 1909. Serial No. 490,163.

*To all whom it may concern:*

Be it known that I, HEINRICH TRILLICH, a subject of the King of Bavaria, residing at Munich, 21 Prinzregentenplatz, Bavaria, Germany, have invented a new and useful Method of Extracting Alkaloid from Coffee and the Like, of which the following is a specification.

This invention relates to a method of extracting the alkaloid from vegetable matters, such as coffee, tea, cocoa, and cola-nuts which contain derivatives of the xanthine, for example, caffein. It is well known, that the value of beverages made from either of the vegetable matters referred to, depend not only upon their percentage of the alkaloid, but also upon their other constituents and also upon the combinations formed in the material during the roasting thereof and before the beverage is made. Moreover, it is known, that the use of a beverage containing the alkaloid is injurious to some people, as such beverages produce disorder of the gastric nerves and to overcome such injurious effects attempts have been made to free the material or other valuable constituents from the alkaloid. Well known methods employed for such purpose essentially consist in the formation of a watery extract from the material to be treated and in the subsequent separation of the alkaloid from such extract by treating the latter with suitable dissolvents. The separated extract poor in or free from the alkaloid is then in certain cases added to the material. These methods present the objection that it is not possible to obtain a product entirely free from caffein.

My invention relates to a new method, whereby the said objection is overcome. The method consists in treating the material containing the alkaloid with a solution of ammonia or the equivalent thereof and in subsequently placing the same with the surrounding liquid into suitable vessels provided with an agitating device, wherein the liberated alkaloid is extracted by means of dissolvents. It is also possible to proceed in the manner, that first, liquid ammonia is successively added to the material containing the alkaloid until it does not absorb any more liquid, then introducing the material into an extractor, then pouring hot water over the same, then adding a dissolvent for separating the alkaloid, and to continue with the extraction, until the alkaloid or most of it is separated. Preferably a Soxhlet's or a Bremer's extractor is employed, in which case the finely distributed condensed dissolvents are permitted to penetrate through the watery liquid after which they are continuously extracted by means of a siphon. The alkaloid can then be recovered from the extracted dissolvents in any known manner.

The dissolvents may be not only liquids heavier than water, such as for example chloroform or carbon-tetrachlorid but also liquids lighter than water such as for example sulfuric ether, acetic ether, or benzin. The construction of the extractor will then have to depend upon the character of dissolvents employed, the essential point being that an intimate mixing of the watery liquid with the dissolvent is rendered possible.

The success of the method is explained by the fact that the alkaloid in the material treated is gradually liberated by the ammonia and is thus better enabled to pass over to the surrounding liquid, that the alkaloid so liberated is separated from this liquid by means of the dissolvent, and that subsequently the fresh alkaloid passes from the material to the surrounding liquid, from which it is again and continuously separated by the dissolvent. During the uninterrupted extraction of the alkaloid from the moistened material by the surrounding liquid the alkaloid is separated wholly or nearly so from the material in a comparatively easy manner. Of course cut-up or ground material can be freed from the alkaloid more easily than unground material. However, it is possible to effectively employ my new method for freeing any vegetable matter, more particularly coffee, from the alkaloid without first cutting up or grinding it. The reintroduction of the extract freed from alkaloid into the material, which with other known methods is necessary and is most difficult is facilitated in my method, it being only necessary after the extraction of a sufficient quantity of the alkaloid from the material, and after the separation of the solution of the alkaloid, to so evaporate the mixture that the surrounding liquid is absorbed by the material. Afterward the moist material is dried in a known manner, and subsequently roasted or dried in kilns according to their specific preparation for use; while the combination of ammonia will volatilize.

Before heating the material which has been subjected to a dissolvent, with the surrounding liquid containing extractive matters, it is possible to gradually add an acid, for example tartaric acid or hydrochloric acid, until the whole results in acid re-action corresponding to the natural acid contents of the original coffee, that is to say, that there is present about 0.3 to at most 0.5 per cent. free organic acid such as tartaric or citric acid. On the contrary if one neutralizes with mineral acid such as hydrochloric, the latter can be added only just to the extent of neutralizing, because otherwise the coffee turns black when it is subsequently roasted; for this reason it is best to use an organic acid. According to the kind of acid used for the neutralizing, ammonia salts make their appearance in the coffee if neutralized with tartaric acid, the result is ammonia tartrate; if neutralized with citric acid, the result is ammonia citrate; and if neutralized with hydrochloric acid the result is ammonium chlorid. These salts decompose or volatilize on roasting.

So far the method in general has been described; the following is an example for illustrating its employment. 100 kilograms of coffee are moistened with a solution of 10% of ammonia until the absorbing of the liquid discontinues. In general about 12 kilograms of the ammonia solution are thus consumed. The moistened coffee is introduced into an extractor which permits an uninterrupted extraction, and 30 liters of warm water are poured over it. In the extractor the contents are from time to time agitated, while the alkaloid is regularly and repeatedly extracted from the surrounding liquid by means of carbon-tetrachlorid, which consecutively is permitted to penetrate through the liquid and is then separated by means of a siphon, until the coffee is sufficiently freed from the alkaloid. When the extraction is finished, the residue of the dissolvent is separated by distillation, then the mixture of the coffee with the surrounding liquid is evaporated in open vessels while being agitated, until the valuable material contained in the liquid is absorbed by the coffee. In this connection it will be stated that the materials previously extracted by the water and contained in the water are absorbed by the coffee, with the exception of the caffein, the latter having been removed. The still moist coffee beans are dried in suitable drying apparatus at a temperature of from 60 to 70° centigrade. The dried coffee is then roasted in the usual manner. The solution of the alkaloid is distilled, the residue is purified and therefrom the caffein is obtained.

As illustrating one form of an apparatus in which a process in accordance with this invention can be carried out, reference is had to the accompanying drawings, which show the apparatus in vertical section.

Referring to the drawing in detail, $b$ indicates a vessel surrounded by a heating jacket $a$ and the vessel $b$ at its lower end is provided with a sieve $s$ on which is placed the coffee beans $c$ moistened with ammonia solution. Then warm water is poured over the beans and upon this the extracting agent $d$ is applied. The extracting agent is withdrawn by the siphon $e$ and discharged into the distilling vessel $f$, the latter being surrounded by a heating jacket $g$; under such conditions the extracting jacket is vaporized. The vapors of the extracting agent pass up through the pipe $i$ which is provided with a valve $h$ into a cooler $k$ where they are condensed. The extracting agent is discharged from the cooler $k$ through pipe $m$ into the vessel $b$ below the sieve $s$. The end of the pipe $m$ is provided with an angularly-disposed portion which is perforated, said angular end being arranged below the sieve $s$ and from the said perforated angular end $n$ the extracting medium is applied to the vessel $b$. The pipe $m$ is provided with a cut-off $l$. The extracting medium when discharged by the end $n$ of the pipe $m$ traverses the ammoniacal mixture of coffee beans with water, in which case it takes up the caffein from the watery liquid, rises to the top of the vessel $b$ and is siphoned off through the medium of the pipe $e$ and is conducted to the still $f$ where it is vaporized and conducted to the cooler $k$. This causes a constant circulation.

If it be desired to perform the extraction not with liquid, but with vaporous extracting agents, the valves $h$ and $l$ are closed, whereby the vapor rising from the distilling vessel $f$ is conducted through the pipe $i$ directly into the pipe $m$, without having to pass through the cooler $k$. The valve $o$ is provided with an angular extension $i^2$ for such pass. The extension $i^2$ carries a valve $o$ for closing the extension $i^2$ when the extraction is carried out with the liquid. If the extracting agent is heavier than water, then the ends of the pipe $e$ and $n$ are correspondingly displaced.

I claim:

1. The herein described method of removing caffein from organic substances containing it, comprising the immersion of the material in a ten per cent. solution of an alkali to liberate the alkaloid, pouring warm water over the material for gradually extracting the alkaloid, continuously extracting the alkaloid from the solution by passing therethrough a dissolvent differing from the solution in specific gravity and heavier, separating the residue of the dissolvent by distillation, evaporating the liquid while agitating the material, and then drying the material.

2. The herein described method of removing caffein from organic substances containing it, comprising the immersion of the material in a ten per cent. solution of an alkali to liberate the alkaloid, pouring warm water over the material for gradually extracting the alkaloid, continuously extracting the alkaloid from the solution by passing therethrough a dissolvent differing from the solution in specific gravity and heavier, separating the residue of the dissolvent by distillation, adding an acid to the solution until the same re-acts acid, in correspondence with its natural acidity, evaporating the solution while agitating the material, and then drying the material while volatilizing the salts formed by the alkaline solution.

3. The herein described method of removing caffein from organic substances containing it, which consists in immersing the material in a ten per cent. solution of an alkali to liberate the alkaloid, agitating the material from time to time, pouring warm water over the material for gradually extracting the alkaloid, continuously passing through the solution a dissolvent different from the solution in specific gravity and heavier for extracting its alkaloid, and discharging the dissolvent charged with alkaloid, separating the residue of the dissolvent by distillation, placing the material with the surrounding solution in an open receptacle, evaporating the solution, and drying the moist material.

4. The herein described method of removing caffein from organic substances containing it, which consists in soaking the material with a ten per cent. solution of an alkali to liberate the alkaloid, pouring warm water over the material for gradually extracting the alkaloid, agitating the material from time to time, continuously extracting the alkaloid from the solution by passing through the latter a dissolvent different from the solution in specific gravity and heavier, which is introduced and permitted to penetrate through the solution, after which it is discharged, separating the residue of the dissolvent by distillation, evaporating the liquid, and drying the moist material.

5. The herein described method of removing caffein from organic substances containing it, which consists in soaking the material with an alkaline liquid, pouring warm water over the material for gradually extracting the alkaloid, agitating the material from time to time, continuously passing through the liquid a dissolvent different from the liquid in specific gravity and heavier for extracting its alkaloid and discharging the dissolvent by distillation, placing the material with the surrounding liquid in a receptacle, evaporating the liquid while agitating the material, and drying the moist material.

In testimony whereof I affix my signature.

HEINRICH TRILLICH.

In the presence of—
Louis Mueller,
Mathilde K. Held.